Patented Apr. 22, 1947

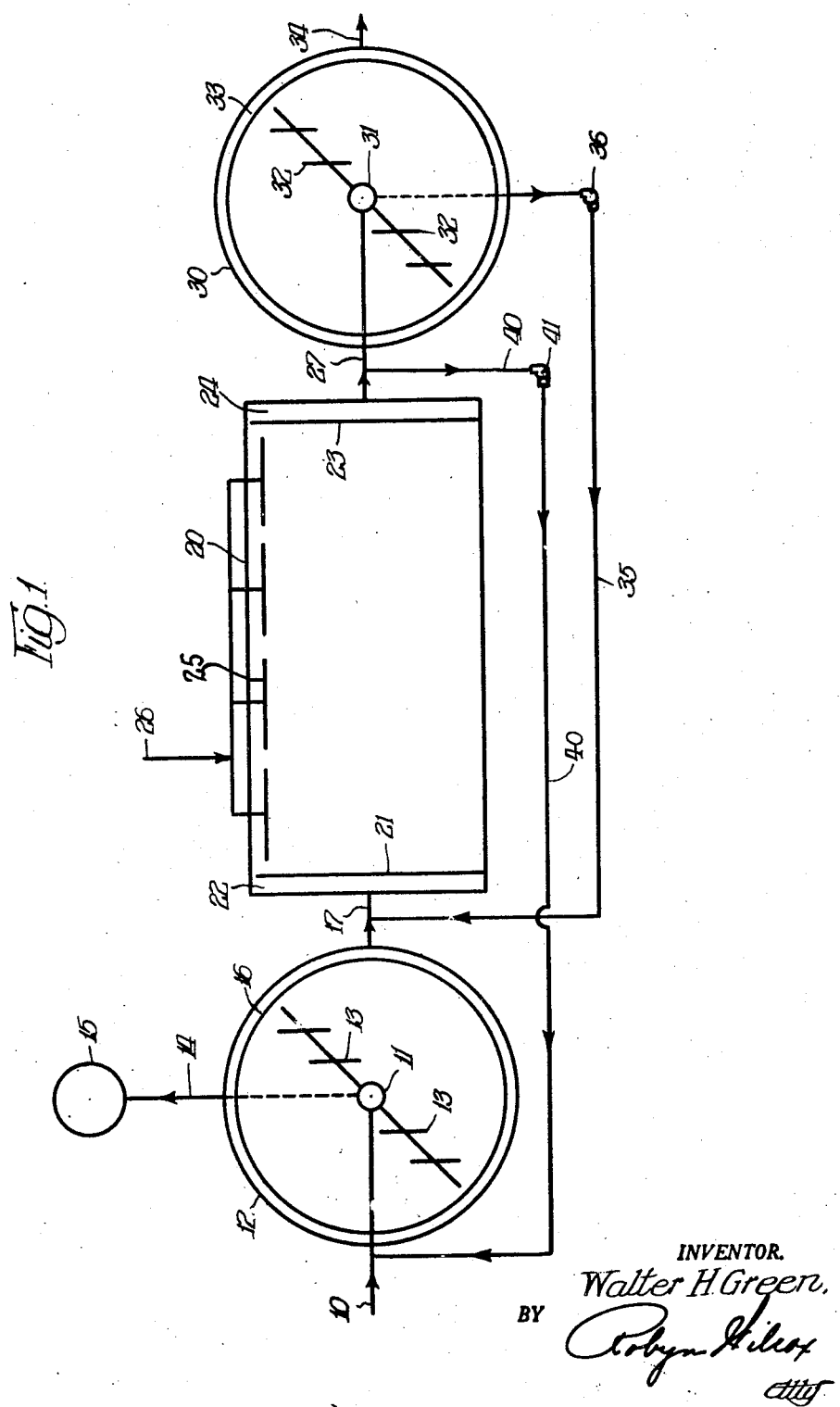

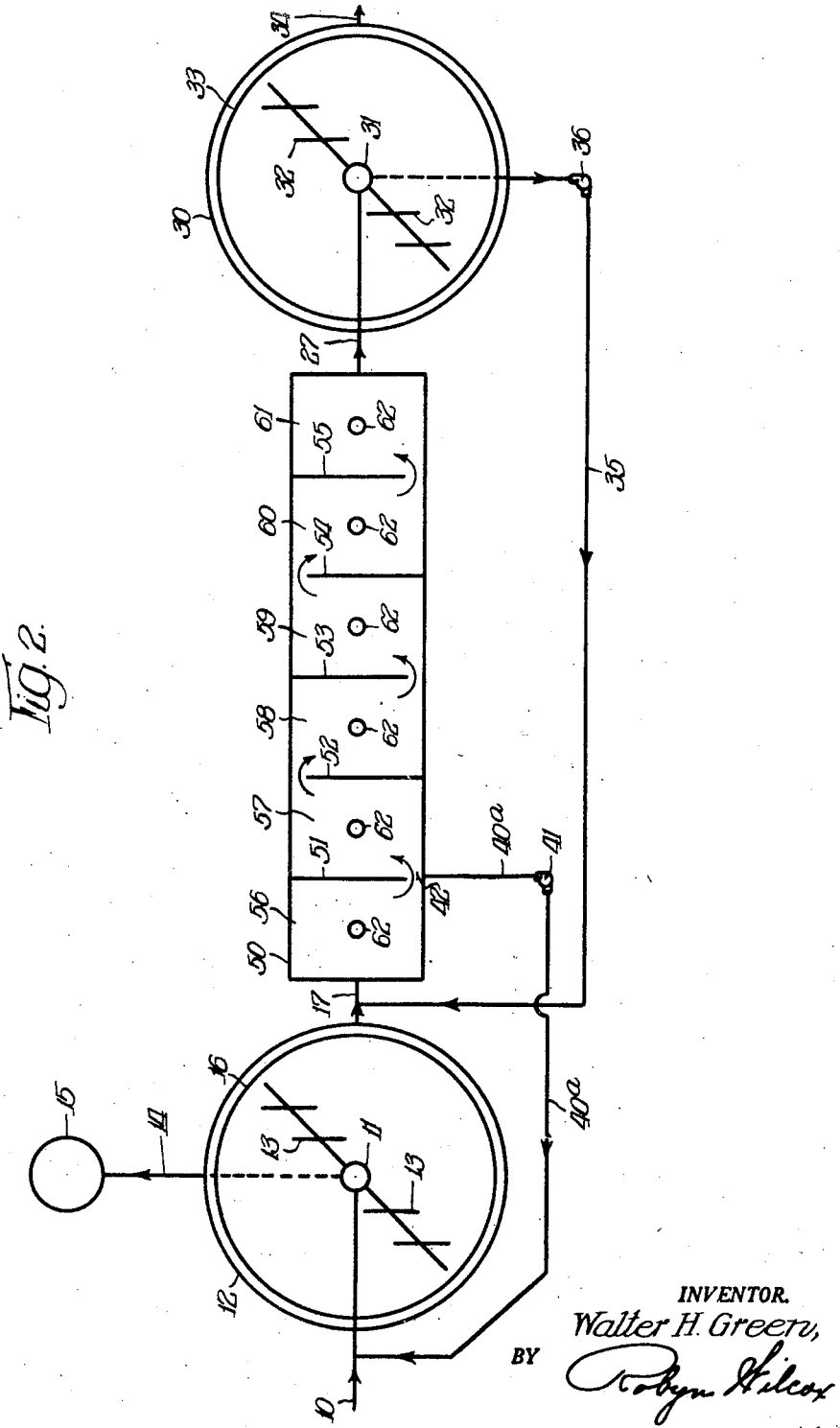

2,419,492

UNITED STATES PATENT OFFICE 2,419,492

SEWAGE TREATMENT

Walter H. Green, Batavia, Ill., assignor to Infilco Incorporated, Chicago, Ill., a corporation of Delaware Application July 1, 1943, Serial No. 493,145

20 Claims. (Cl. 210—8)

This invention relates to the treatment of waters polluted with organic matters and is a continuation in part of my application entitled "Sewage treatment," Serial No. 358,235.

The invention herein described is particularly directed to the purification of aqueous liquids such as sewage, trade wastes, and the like, herein sometimes referred to as "polluted liquid," by what may be called an activated sludge process but is useful in other similar treatments.

A main object of my invention is to improve the treatment of polluted liquids by changes in the customary activated sludge process to secure more rapid and complete purification.

A specific object is to improve the first, or what is commonly spoken of as the "primary," sedimentation step of an activated sludge process.

Another particular object is the improvement of the biological results of an activated sludge process.

Still another object is to reduce the size of the clarifiers of an activated sludge plant, and thus the cost of the plant.

A still further object is to reduce the size and cost of operation of aeration basins of activated sludge plants.

Still other objects will be mentioned in the course of the description or will become apparent upon consideration of my improved process and apparatus.

In the conventional activated sludge process the sewage, commonly called "raw sewage," ordinarily after having been passed through a screen or grit chamber, enters a primary settling tank, or primary clarifier, in which it is retained in a quiescent condition for a period of two hours or more to allow the more readily settleable solids, or the so-called "raw sludge," to deposit. Sludge accumulating in this basin is periodically removed to a digester in which it is anaerobically digested, or otherwise disposed of in some other suitable manner. From the primary clarifier, the more or less clarified sewage, commonly known as clarified raw sewage, flows through an aeration basin or basins in which it is aerated and mixed with returned activated sludge for a period of six to eight hours. From the aerator, the mixed liquor, which is a mixture of sewage liquor and suspended solids or sludge, passes into a second, or final, settling basin or clarifier, wherein the solids deposit during the course of a quiescent detention of about two hours or more. The clarified, treated sewage flows to waste from the final clarifier and the sludge, i. e., deposited solids, is returned, in part, to the aeration basin to supply the activated sludge necessary for the operation of this process and the excess is wasted. In order that the biologic process of purification which takes place in the aeration tank may be sufficiently active, the major portion of the sludge deposited in the second settler, which is known as activated sludge, is returned to the inlet of the aeration basin for seeding clarified raw sewage. Due, however, to continuous feed of sewage containing the materials from which activated sludge is formed, and also due to biological growth and multiplication of the bacteria in the sludge, there is an increase or accumulation of activated sludge beyond that required to inoculate or activate the aeration basin. The excess sludge, which must be digested or otherwise rendered innocuous, has heretofore been collected in the secondary clarifier along with the sludge used for return to the aerator. Sometimes the excess sludge has been discharged from the secondary clarifier into an anaerobic digester, or otherwise separately treated, and sometimes the excess sludge has been returned from the secondary clarifier to the primary settling tank, where it was first re-suspended and mixed with the entering raw sewage, and then settled in admixture with the raw sludge, the mixed sludge being digested or otherwise disposed of.

I have discovered by observation and tests that improved results are obtained by modifying the conventional activated sludge process in the manner of wasting excess sludge.

In the conventional process, all of the mixed liquor from the aeration tank is passed into a final clarifier for the sedimentation of substantially all of the solids therein, and the excess sludge that is sent to waste is taken from the final clarifier as settled sludge. In contrast, I pass to the final clarifier only such portion of the mixed liquor which contains the amount of sludge required for the aeration chamber, and dispose of the excess sludge by returning a portion of unsedimented mixed liquor which contains the amount of sludge required to be wasted to the primary clarifier and mix such returned mixed liquor with entering raw sewage, and settle the admixture of raw and activated solids therein. Or I may withdraw a portion of the mixed liquor sufficient to carry the excess sludge from a point within the aeration basin, so located as to remove mixed liquor after a period of treatment therein of approximately one hour, and return the withdrawn portion to the primary clarifier for admixture with the entering raw sewage. In this manner some hitherto unknown and unexpected benefits are obtained, as will be hereinafter pointed out.

The invention will be more readily understood by reference to the accompanying drawings in which like reference characters are used to designate similar elements.

Figure 1 is a diagrammatic plan view of a treatment plant illustrating one embodiment of my invention.

Figure 2 is another diagrammatic view of a treatment plant illustrating a second embodiment of my invention.

For purposes of illustration the plant of Figure 1 is shown as utilizing diffused air as the means for mixing and aerating the mixed liquor in the aeration basin, although it will be obvious that other suitable aerating means can be used. The raw sewage, which usually has been subjected to some preliminary treatment such as screening, grit or grease removal, or the like, passes through an inlet pipe 10 into an inlet portion or feed well 11 of a primary clarifier 12. Customarily, such a clarifier or settling basin is provided with a sludge moving mechanism or scraper 13 to move settled solids along the floor of the basin to a sludge sump, not shown, in order to facilitate removal or discharge of settled solids from the basin. The settled solids are removed by any suitable means, such as a sludge pipe 14, to a sludge digester 15, or other disposal apparatus. The clarified sewage in the clarifier 12 is collected by any suitable means such as an effluent launder 16, and flows through a clarified raw sewage conduit 17 into an aeration basin 20.

As indicated above, this embodiment of my invention illustrates the use of a diffused air plant. In such a plant, the aeration basin 20 is customarily a rectangular basin which may be 12 to 20 feet wide, 8 to 15 feet deep and from 100 to 400 feet in length. I prefer to provide a diffusing baffle 21 adjacent the end into which the clarified raw sewage conduit 17 discharges, thereby providing an inlet portion 22. I also prefer to provide a diffusing baffle 23 at the opposite or outlet end of the aeration chamber, thereby providing an outlet section 24. In such a treating plant the returned activated sludge is thoroughly mixed in and with the clarified raw sewage, and the mixture is thoroughly aerated by means of air diffusers 25, supplied with compressed air by any suitable means such as an air pipe 26 from a source of compressed air, not shown. Preferably the diffusers 25 are placed along one side wall, as shown in Figure 1, or along the center of the tank, in order to give the mixed liquor therein a rolling or spiral motion from inlet to outlet. Aeration basins are usually of such size as to provide an aeration treatment lasting from 6 to 8 hours. An aerator effluent conduit 27 leads from the outlet portion 24 of the aeration basin 20, and discharges into a secondary or final clarifier 30. Customarily the secondary or final clarifier 30 will be constructed in a manner similar to that of the primary clarifier 12 and will include an inlet well 31 into which the aerator effluent conduit 27 discharges, a sludge scraping mechanism 32 for moving settled solids along the floor of the basin to a sludge sump, not shown, and an outlet weir 33 communicating with the outlet pipe 34, through which the treated sewage is discharged to waste.

The activated sludge required in the aeration basin settles in the final clarifier 30 and can be returned to the aerator by any suitable means such as return sludge pipe 35 equipped with a pump 36. Preferably the return sludge pipe 35 will discharge into the inlet section 22 of the aeration basin 20 or into the clarified raw sewage conduit 17, as shown.

The sewage treating plant as heretofore described is conventional and is not claimed herein except in combination with my improved means for removing excess sludge. My improved process, as indicated above, comprises taking unclarified, mixed liquor from the aeration basin 20, prior to sedimentation in the final clarifier, and returning it to the primary clarifier. To carry out this process I add to the conventional plant above described, suitable means for such return of unclarified mixed liquor, such as conduit 40, equipped with a suitable pump 41 leading from the aerator effluent conduit, or mixed liquor pipe 27 and discharging into the raw sewage conduit 10, as shown, or otherwise into the inlet well 11 of the primary clarifier 12. This construction provides means whereby a minor portion of the unclarified mixed liquor passing from the aeration basin 20 may be delivered to the primary settler 12. Obviously, the excess sludge line 40 need not be a branch from mixed liquor pipe 27 but could take liquid directly from the outlet zone 24 of aerator basin 20. Valves, not shown, may be provided to control the direction and quantity of liquid flow as desired.

In the operation of my invention I return to the primary clarifier a portion, usually about 10 per cent, of the mixed liquor, which returned mixed liquor is mixed with entering raw sewage. The solids contained in both the mixed liquor and the raw sewage settle together and are thereafter handled as one sludge. The clarified liquid from the primary clarifier then passes to the aerator in which it is mixed with settled activated sludge from the secondary clarifier. After the necessary aeration treatment, the mixed liquor is divided, one portion being returned to the primary clarifier for admixture with raw sewage, as above mentioned, while the balance flows to the secondary clarifier for the separation of solids and liquid. The clarified liquid is discharged to waste and normally all of the solids deposited in the secondary clarifier are returned to the aerator for seeding and activating the clarified sewage entering the aeration basin. In contrast with conventional practice of returning only about 80 to 90 per cent of such sludge to the aerator, and wasting the balance of the settled sludge, I desire to avoid unnecessary settling of activated sludge in the secondary clarifier, and thus control the amount of activated sludge required to be retained in the process through control of the amount of mixed liquor returned to the primary clarifier.

There are, of course, individual variations between plants, or within the same plant at different periods, in the amount of activated sludge formed in the process. Ordinarily, mixed liquor contains about 25 per cent by volume settleable solids. In the prior art all such solids were settled in the final clarifier 30 and about 90 per cent of this sludge was returned to the aerator basins while about 10 per cent was disposed of as excess sludge. In carrying out my improved process all of the sludge settling in the final settling basin 30 will be normally returned to the aeration basin 20. The quantity of liquid diverted through the excess sludge pipe 40, to the primary clarifier 12, will be of the order of about 10 per cent of the total flow through the aerator 20, so as to carry the excess sludge that must be removed. The quantity of liquid thus entering the primary clarifier 12, in my process is greater than that entering under the process as heretofore carried out, but the advantages gained more than offset this increase in quantity of liquid to be clarified therein. Due to better sedimentation of the mixture of raw and unsettled excess sludge, a plant operating under my invention will require no increase in the size of the primary sedimentation basin.

I have found that the sedimentation in the primary clarifier 12, is substantially improved by the return of solids to it in the way described as compared with returning the same amount of solids in the form of settled sludge from the final settling basin 30. Thus, I have found that the suspended solids and amount of pollute in the clarified raw sewage is generally lower when raw sewage and unclarified mixed liquor are mixed and allowed to settle than when the same raw sewage and settled activated sludge are mixed and allowed to settle under like conditions and for similar periods of detention, the actual solids content of the returned material being equal in both cases. Also, the settled sludge is generally more compact when the raw sewage is mixed with mixed liquor from the aerator 20 than when mixed with settled and re-suspended activated sludge from the final clarifier 30, other conditions being equal. The findings referred to are in keeping with my experience made in other connections, that a presettled and re-suspended sludge never settles quite as well as the solid particles of an unsettled suspension of similar materials.

Not only is there obtained this improvement in sedimentation but there are also improvements from the biological standpoint. The organisms which are propagated by the activated sludge process and upon which the activated sludge process depends are of the aerobic type. During the settling and retention of the sludge in the final clarifier 30, these organisms are held under anaerobic conditions with consequent damage and loss of activity. By returning unsettled mixed liquor, which contains fresh activated sludge particles, from a point prior to the final clarifier 30, into the primary clarifier 12, the aerobic organisms are introduced into this primary basin in a highly activated condition, so that their beneficial effect begins immediately and is more pronounced both in this primary basin and in the aerator in so far as such organisms are carried over into the aerator.

Also those aerobic organisms which are returned to the primary settler are intimately mixed with the various organisms and putrescible solids comprising the so-called raw sludge i. e., the solids contained in the incoming raw sewage, and they settle out together with the same. For some reason, the mixture of fresh activated sludge solids in the unclarified mixed liquor and the solids in the raw sewage settles more rapidly and completely than either alone. Also, as the solids returned contain fresh and active aerobic organisms, there will be less tendency of the sludge in the preliminary tank to turn septic and thus to unfavorably affect the liquid therein. The removal of the sludge from the various points of the tank bottom, by scraping equipment or the like, therefore may be done at a slower rate, thereby in turn improving the settling conditions in the tank.

Further benefits are obtained from my invention due to the fact that there is less flow into the final clarifier and consequently a smaller amount of solids or sludge to be deposited therein. As a result, this basin may be reduced in size and the sludge settling therein may be returned to the aerator basin in better condition.

The plant shown diagrammatically in Figure 2 illustrates another embodiment of my invention. For purposes of illustration this plant is shown as utilizing the mechanical type of aeration and agitation although it will be obvious that it could be used equally well with the diffused air, or other type of aeration. The primary clarifier equipment, the digester and the final clarifier equipment, and the interconnecting piping are the same as shown in Figure 1 and the same reference characters are applied thereto. The aeration basin, however, is different and will, therefore, be briefly described. In such a plant the aeration is provided in a plurality of small, usually square, individual basins or, as shown, in a rectangular chamber 50, divided by a plurality of partial partitions 51, 52, 53, 54 and 55 into a plurality of interconnected aerating basins 56, 57, 58, 59, 60 and 61 respectively. It is customary in the mechanical aerator type of plant, to pass the sewage through the aeration basins, such as 56 to 61 inclusive, in sequence so that the mixed liquor of clarified raw sewage and returned activated sludge is aerated in a plurality of individual steps. Customarily aeration is provided by mechanical aerators 62 of well known type which need not be described but which generally provide a closed circulation within each individual chamber, 56 to 61 inclusive, of sufficient surface turbulence to provide for the necessary aeration of sewage therein.

In this embodiment of my invention, instead of returning the mixed liquor in an amount sufficient to contain the excess sludge from the outlet end of the aeration basin, that is, from basin 61 or aerator outlet conduit 27, as in Figure 1, I withdraw the mixed liquor containing the excess sludge from one of the first basins, preferably the first or second, such as 56 or 57. It has long been known in the activated sludge process of sewage treatment that the returned activated sludge rapidly absorbs pollute from the clarified raw sewage, so that ordinarily within periods of from a few minutes to an hour, the major portion of the pollute has been removed from the raw sewage. However, satisfactory purification is not obtained, nor a satisfactory activated sludge formed for use in the aerator, by aeration for periods of one or two hours, but only by prolonged aeration of six to eight hours. In Figure 2 the aerator 50 has been divided into six chambers with an assumed average holding time in each of about an hour. In such a case the effluent from the aeration basin 56, while unsatisfactory for final disposal, contains solids or sludge which have absorbed a major portion of the pollute from the sewage entering that basin and is highly active. Also, such sludge has coagulated the pollute in such form that when returned to the primary clarifier 12 it will readily settle with the solids in the entering raw sewage. The return of such partially aerated sewage to the primary clarifier does not endanger the treatment, for obviously all liquid so returned will again be passed to the aerator, and liquid cannot be discharged from the treatment plant until it has received the full aeration treatment. The remainder of the aeration basins 57, 58, 59, 60 and 61 are necessary to fully complete purification of the sewage, and thereby provide a satisfactory effluent and a satisfactory sludge for return to the aerator. In this second embodiment of my invention I therefore return excess sludge not from the mixed liquor discharged from the aerator or final chamber thereof but from a point within the aerator after the sewage has undergone purification for a short period, such as up to one hour or thereabouts. For this return I provide an excess sludge return line 40a, provided with a suitable pump 41, leading from the effluent section 42, of the first aeration basin 56. By such a return I secure the beneficial effect of mixing raw sewage and unsettled mixed liquor from the aerator in the primary clarifier. On the other hand by taking the mixed liquor from the first aerating basin 56, it is unnecessary to provide prolonged aeration for such returned mixed liquor, which customarily is about 10 per cent of the sewage entering the plant for treatment. Therefore, the subsequent aeration basins such as 57, 58, 59, 60 and 61 can either be reduced in size or will provide approximately 10 per cent more aeration of sewage in each basin. As is well known in the art, the activated sludge process is quite expensive due to the power requirements of supplying the necessary aeration and agitation so that such a reduction, as is herein made possible, is important.

It is believed that the operation of the plant of this embodiment is obvious. The clarified raw sewage from the primary clarifier 12, enters the aerator 50, through the clarified raw sewage conduit 17, and is admixed with the sludge separated from the mixed liquor in the final clarifier 30. The mixed liquor is subjected to aeration in the first aeration basin 56 for a period of about an hour. As the mixed liquor flows from the first aeration basin 56, into the second aeration basin 57, approximately 10 per cent of the liquor is withdrawn through pipe 40a and pumped back into the primary clarifier 12, where it is admixed with the entering raw sewage. The remaining 90 per cent of the mixed liquor discharged from the first aeration basin 56 passes through the subsequent aeration basins 57, 58, 59, 60, and 61 and eventually into the final clarifier 30 in the usual manner.

Upon consideration of the foregoing disclosure various changes may occur to persons skilled in the art, and such changes are intended to be included herein.

I claim:

1. A method of sewage treatment by the activated sludge process which comprises passing the incoming sewage through a first clarification step, passing the solids deposited in said first clarification step to waste, passing the clarified effluent through an aeration step, passing a portion of effluent from the aeration step through a second clarification step, returning another portion of effluent from the aeration step, prior to clarification thereof, to the first clarification step, returning deposited sludge from the second clarification step to the aeration step, and discharging clarified liquid from the second clarification step to waste.

2. A process of treating sewage by the activated sludge process comprising the steps of first passing the raw sewage through a sedimentation zone, withdrawing deposited solids from said sedimentation zone to waste, passing the settled sewage through an aeration zone, introducing air into the sewage in said aeration zone, then passing the major portion of the sewage leaving the aeration zone through a second sedimentation zone, withdrawing clarified liquid from said second sedimentation zone to waste, returning substantially all of the sludge deposited in the second sedimentation zone to the aeration zone, and returning a minor portion of aerated sewage from the aeration zone to the first sedimentation zone for repassage through the first sedimentation zone with raw sewage.

3. A method according to claim 2 wherein the portion of the aerated sewage returned to the first sedimentation zone is of the order of about ten per cent of the liquid passing through the aeration zone.

4. In the activated sludge process of sewage treatment which includes clarifying sewage in a first clarification zone, then mixing the clarified sewage with activated sludge, aerating the mixture of clarified sewage and activated sludge, clarifying the mixed liquor in a second clarification zone, passing clarified liquor to waste, and returning a portion of the activated sludge from the second clarification zone for admixture with further quantities of clarified sewage: the improvement that resides in diverting a portion of the unsettled freshly aerated mixture after a period of treatment in the aeration step and returning such diverted portion of freshly aerated mixture to a stage in said process preceding the first clarification step.

5. In combination with the activated sludge process of sewage purification wherein sewage is first subjected to a primary clarification treatment, then to an aeration treatment and then a secondary clarification treatment, and sludge from the secondary clarification treatment is returned to the aeration treatment, the step that comprises passing a portion of freshly aerated and unclarified liquid taken from the flow following the aeration treatment and prior to entry into the subsequent clarification treatment back into the process at a stage ahead of the primary clarification treatment.

6. Apparatus for the treatment of sewage by the activated sludge process comprising a primary sewage clarifier, a raw sewage inlet conduit thereinto, means for withdrawing deposited solids from the lower portion of said clarifier, an aerator, a clarified raw sewage outlet from said primary clarifier communicating with said aerator, a second clarifier, a mixed liquor outlet from said aerator communicating with said second clarifier, a clarified liquid outlet conduit from said second clarifier, a sludge return conduit leading from said second clarifier back to said aerator, and means for returning aerated but unclarified sewage from said aerator to said primary sewage clarifier comprising a conduit joining said mixed liquor outlet to said primary clarifier.

7. In apparatus for the activated sludge treatment of sewage comprising in combination a primary clarification basin, an aeration basin, means for aerating sewage in the aeration basin, a secondary clarification basin, a raw sewage inlet conduit discharging into said primary clarification basin, an outlet from said primary clarification basin leading to said aeration basin, an outlet from said aeration basin leading to said secondary clarification basin, a treated sewage conduit from said secondary clarification basin to waste, a sludge conduit leading from the primary clarification basin for withdrawing deposited solids therefrom, and a return activated sludge conduit leading from the secondary clarification basin for delivering deposited solids from said secondary clarification basin into said aeration basin: the combination with said aeration basin and said primary clarification basin of a conduit leading from said aeration basin to said primary clarification basin, whereby unclarified aerated sewage may be delivered back to said primary clarification basin.

8. In the treatment of sewage by the activated sludge process wherein sewage is passed through a primary clarification zone, an aeration zone, and a secondary clarification zone, part of the sludge solids formed in the aeration process is returned from the secondary clarification zone to the aeration zone and part discharged to waste, and sludge withdrawn to waste from the primary clarification zone, the improved method of diverting to waste the excess sludge formed in the process that resides in taking from the flow of sewage undergoing treatment and at a stage in the treatment following aeration but prior to entry into the secondary clarification zone a portion of the sewage containing the amount of sludge required to be wasted and returning said portion into the primary clarification zone.

9. In the activated sludge treatment of sewage which comprises passing raw sewage into a first clarification step, separating solids from sewage in said first clarification step, passing the clarified sewage through an aeration step, passing mixed liquor from the aeration step through a secondary clarification step, discharging the clarified sewage from the secondary clarification step to waste, withdrawing deposited solids from the secondary clarification step and conducting such solids back into the aeration step, and discharging solids separated from sewage in the primary clarification step and excess solids formed in the process to waste, the improved method of wasting excess sludge that comprises taking about 10 per cent of the amount of mixed liquor from the aeration step and returning it directly into the primary clarification step, whereby there is obtained a mingling of unclarified mixed liquor and raw sewage in said primary clarification step.

10. In combination with a system for an activated sludge sewage treatment comprising a first clarifier, an aerator, a second clarifier, a clarified sewage conduit leading from said first clarifier to said aerator, a settled solids outlet conduit leading from said first clarifier, clarified liquid withdrawal means leading from said second clarifier, and sludge withdrawal means leading from said second clarifier and discharging into said aerator: conduits for aerated sewage leading from said aerator to said first and second clarifiers, whereby freshly aerated mixed liquor may be delivered to both clarifiers.

11. In an activated sludge sewage treating process which includes a primary clarification step, an aeration step, a secondary clarification step, and return of sludge from the secondary clarification step to the aeration step: the method of improving clarification of sewage in the primary clarification step which comprises taking a portion of the mixed liquor from the aeration step after a period of aeration therein but prior to complete aeration thereof and returning such aerated mixed liquor while in a freshly aerated and unclarified condition to the primary clarification step, whereby the clarification of the raw sewage is aided by the presence of freshly activated sludge.

12. In the activated sludge process of sewage treatment that includes clarification of sewage in a primary clarification zone, the aeration of the clarified sewage and sludge solids in an aeration zone, the separation of sludge solids from aerated sewage in a secondary clarification zone, and return of a predetermined amount of sludge solids from the secondary clarification zone to the aeration zone, the combination that comprises the steps of dividing the aerated sewage into a first portion containing the proportion of sludge solids required to be returned to the aeration step, which portion is sent to said secondary clarification zone for said separation of solids therefrom, and a second portion containing the proportion of solids in excess of that required to be returned to the aeration step, and delivering said second portion while still in a freshly aerated and unsettled condition, back into the primary clarification zone, whereby solids in such second portion may be settled in the primary clarification zone and the liquid returned to the aeration zone.

13. The apparatus of claim 7 wherein the conduit leading from said aeration basin to said primary clarification basin communicates with said aeration basin at the outlet end thereof.

14. Apparatus according to claim 7 wherein the conduit leading from said aeration basin to said primary clarification basin leads from a point within said aeration basin at which said mixed liquor has normally undergone a period of areation therein of the order of about one hour.

15. In the treatment of sewage by the activated sludge process wherein sewage is passed through a primary clarification zone, an aeration zone and a secondary clarification zone, a portion of the sludge formed in the aeration zone is returned from the secondary clarification zone to the aeration zone, excess sludge formed in the aeration zone is wasted, and sludge withdrawn to waste from the primary clarification zone, the improved method of removing the excess sludge formed in the process that comprises diverting a portion of sewage undergoing treatment in the aeration zone and returning the same into the primary clarification zone, for sedimenetation therein.

16. In the activated sludge process of sewage purification wherein sewage is passed first through a primary clarification zone, then through an aeration zone and finally through a secondary clarification zone, and sludge is returned from the secondary clarification zone to the aeration zone, the combination that comprises withdrawing freshly aerated and unclarified sewage from an initial region of the aeration zone and passing such liquid back into the process ahead of the primary clarification zone, for clarification therein.

17. The process of claim 16 wherein the region from which the unclarified aerated sewage is withdrawn is so placed within the aeration zone that sewage withdrawn will have undergone treatment in the aeration zone for a period of the order of about one hour.

18. In apparatus for the activated sludge treatment of sewage comprising in combination a primary clarification basin, an aeration basin, aerating means in the aeration basin, a second clarification basin, a raw sewage inlet conduit discharging into said primary clarification basin, a clarified raw sewage conduit leading from said primary clarification basin to said aeration basin, a mixed liquor conduit leading from said aeration basin to said secondary clarification basin, a treated sewage outlet conduit leading from said secondary clarification basin to waste, a sludge outlet conduit for withdrawing deposited solids leading from the primary clarification basin, and a return activated sludge conduit leading from the secondary clarification basin to the aeration basin for withdrawing solids from the secondary clarification basin and delivering the same into the said aeration basin: a conduit leading to said primary clarification basin from a point in said aeration basin closer to the inlet end than to the outlet end thereof, whereby unclarified sewage undergoing aeration may be delivered back to said primary clarification basin prior to completion of aeration in said aeration basin.

19. A method of sewage treatment which comprises passing the sewage through a primary clarification zone, passing solids deposited in said primary clarification zone to waste, passing the clarified sewage from the primary clarification zone through an aeration zone, then passing a portion of the aerated sewage from the aeration zone through a secondary clarification zone, returning solids deposited in the secondary clarification zone to the aeration zone, and passing another portion of the aerated sewage from the aeration zone to the primary clarification zone, such last mentioned portion being of sufficient volume to carry the quantity of solids that are to be wasted from the aerated sewage.

20. Apparatus for sewage treatment comprising a primary clarification basin, an aeration basin, a secondary clarification basin, a passageway from said primary clarification basin to said aeration basin, aerating means in said aeration basin, a passageway from said aeration basin to said secondary clarification basin, a passageway from said secondary clarification basin into said aeration basin, and a passageway from said aeration basin into said primary clarification basin.

WALTER H. GREEN.

REFERENCES CITED

The following references are of record in the file of this patent:

UNITED STATES PATENTS

| Number | Name | Date |
|---|---|---|
| Re. 22,144 | Ward | July 21, 1942 |
| 2,167,443 | Bevan | July 25, 1939 |
| 2,168,208 | Jenks | Aug. 1, 1939 |
| 2,270,869 | Ditto et al. | Jan. 27, 1942 |
| 2,118,266 | Nordell | May 24, 1938 |
| 2,089,162 | Goudey et al. | Aug. 3, 1937 |
| 1,254,841 | Noble | Jan. 29, 1918 |